Sept. 7, 1943.  R. A. NICHOLSON  2,328,669
DRUM COUPLING
Filed Aug. 18, 1941
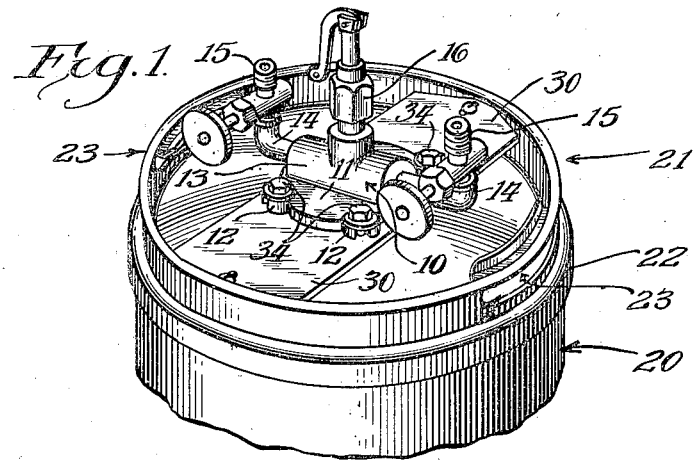
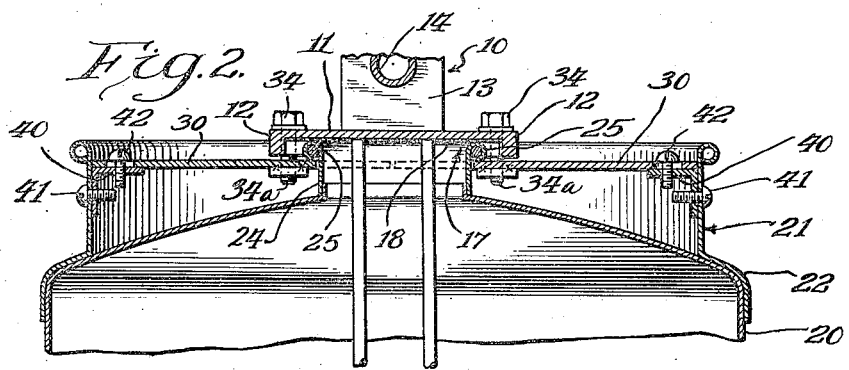
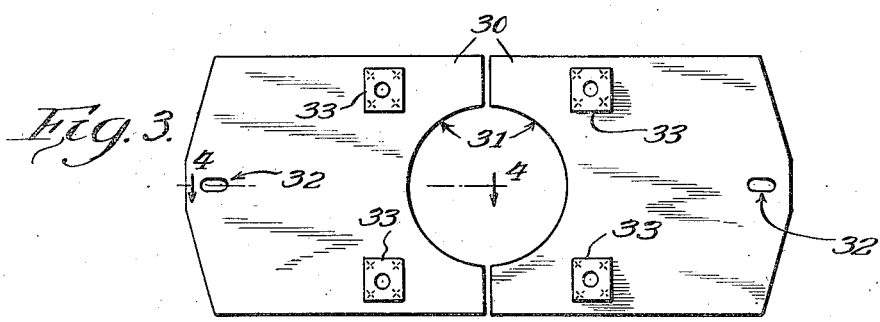
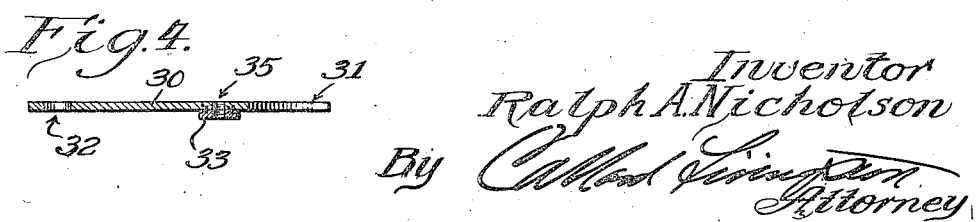
Inventor
Ralph A. Nicholson
By  Attorney Patented Sept. 7, 1943

2,328,669

UNITED STATES PATENT OFFICE 2,328,669

DRUM COUPLING

Ralph A. Nicholson, Chicago, Ill., assignor to Raymond T. Moloney, Chicago, Ill.

Application August 18, 1941, Serial No. 407,333

3 Claims. (Cl. 220—85)

This invention pertains to coupling devices of the type used to connect a valve or conduit or the like with a drum or tank or the like.

One of the principal objects is a simple device for mounting a valve assembly or head on a supply drum to establish an air-tight coupling and a mechanically strong support for the valve head.

Another object is to provide a combination support and coupling for use with a supply drum of the type having a throat surrounded by an apron or skirt, the coupling and support consisting simply of plates surrounding the throat and held in gripping air-tight engagement therewith by coaction with the valve head, which is attached to the plates so as to press against the outlet to the throat, the plates extending for connection with the skirt for additional support and rigidity.

Viewed from another aspect, the broadly essential features of novelty of the invention reside in the provision of a plurality of mounting plates formed to fit around a throat or conduit about which they are held firmly by connection with the member to be coupled, which member is held by coaction of the plates and throat or conduit, in air-tight engagement with the latter.

Other objects, advantages and features of novelty reside in details of the construction, assembly and functional cooperation of the preferred embodiment hereinafter described in view of the annexed drawing in which:

Fig. 1 is a fragmentary perspective of a drum with the coupling engaged therewith;

Fig. 2 is a fragmentary cross section of the drum and coupling;

Fig. 3 is a bottom plan view of a pair of coupling plates;

Fig. 4 is a sectional detail through one of the coupling plates as viewed along lines 4—4 in Fig. 3.

In Fig. 1 there is indicated generally at 10 what may be termed a valve head or coupling, which consists of a base or flange portion 11 having a plurality of bolt bosses 12 disposed thereabout, each of which is a threaded bore to receive nipples 14 connecting into valves 15 and 16.

The underside of the flange is recessed as at 17 (Fig. 2) to receive a sealing gasket 18 of rubber or the like, which is to be pressed against by action of the coupling assembly, as will presently appear.

While the novel coupling will cooperate with a variety of flanged throats or conduits, it is especially suited for use with the construction chosen for illustration, that is to say, with a steel drum 20, such as shown in Figs. 1 and 2, having an upstanding rim, skirt, or apron 21 forming part of a chime 22 which is welded onto the upper end of the drum.

The foregoing construction, it may be observed, makes possible a drum having a rounded end wall with consequent strength to withstand higher internal pressures, for use with carbonated beverages and the like; while the skirt makes it possible to stand the drum on end, and also facilitates handling the drum in view of the fact that it lends itself to the provision of large punch-outs 23 forming handles.

At the apex or center of the domed end of the barrel or drum, there is formed a throat 24 (Fig. 2) opening upwardly and having a beaded or turned upper edge providing a coupling flange, bead, or protusion 25 of known construction.

The recessed base structure 11—17 of the valve head is adapted to fit down closely upon the flanged mouth of the throat as illustrated in Fig. 2, for engagement with the coupling means now to be described.

Referring conveniently between the several figures, the novel coupling structure comprises a pair of identical mounting plates 30 each having throat-engaging formations in the form of semi-circular or arcuate recesses or inflections 31 at one end, and elongated screw-receiving slots 32 at an opposite end.

Adjacent the throat-engaging formations on each plate are several bolt-receiving formations 33, preferably in the nature of metal slugs spot-welded or fluxed to the plates and drilled and tapped as at 35, Fig. 4, to receive the threaded ends 34a of attaching bolts 34 extending through bosses 12.

By tightening the bolts 34, it is apparent that the portions immediately adjoining the recessed parts 31 of the plates will be clamped tightly up against the underside of the throat bead or flange 25, thus in turn clamping the underside of the base portion 11 of the valve head, and the gasket 18, firmly down against said beading or flange on the throat, thus effecting an air tight coupling of the valve head to the throat of the drum.

Further stability and mechanical strength in the coupling is afforded in the combination with the coupling plates of means affording an adjustable connection between the coupling plates and skirt, said means including angle brackets 40 (Fig. 2) underlying the outer end of each plate and each secured by screw means 41 to the skirt, and by screw means 42, extending through elongated slots 32 to the corresponding plate.

In the illustrative embodiment, the drum 20 is intended to contain a quantity of beverage, while the valve nipples 15 are to be connected respectively to a source of compressed carbon dioxide or other gas, and to a dispensing line neither of which is illustrated.

The assembly is installed by simply fitting the recessed throat-receiving formations against the throat, engaging and tightening the bolts 34, and securing screws 42.

It will be apparent that a larger number of plates 30 could be used, if desired for any reason, and that the invention embraces such extensions of the broad structural and functional principles and means disclosed, as well as all other modifications fairly coming within the ambit of the improvements shown, described, and claimed.

I claim:

1. For use with a drum of the type having an upstanding rim at an end and an upstanding throat concentric of said rim and provided with flange means near the entrance thereto, coupling means comprising, in combination with a member to be coupled to said throat, the following improvements, namely; a set of coupling plates adapted to be arranged on opposite sides of said throat and each having a throat-engaging formation shaped to interfit with the throat whereby said plates in assembled condition substantially surround said throat in a horizontal plane immediately beneath said flange means, said member to be coupled resting upon the throat at the entrance thereto above said flange means, bolt means interconnecting said member to be coupled and said plates and serving to clamp the member and plates against said flange means to draw the member to be coupled in air-tight fit against the throat, and means supportably attaching each of said plates to said rim at ends of the plates opposite from the throat-engaging formations thereon.

2. In combination, a container having a throat with coupling protrusions adjacent the mouth thereof, and a skirt surrounding said throat in spaced relation thereto, a member to be coupled to said container and seated upon the mouth of said throat, a set of coupling plates, two or more in number, arranged in a plane normal to the longitudinal axis of said throat in circumambient relation to the latter, each said plate having an inflected portion complementary in shape to that portion of the throat engaged thereby, whereby the set of plates may be fitted closely about the throat as aforesaid, bolt means for drawing said member to be coupled and said plates together to clamp said coupling protrusions therebetween and draw said member to be coupled firmly against the mouth of the throat, and bracket means attached to said skirt at points oppositely remote from the inflected portions of said plates for supporting the latter.

3. The combination of claim 2 in which said bolt means extends from said member to be coupled into threaded engagement with said plates, each plate having one or more slugs spot welded thereon and tapped for threaded engagement with said bolt means.

RALPH A. NICHOLSON.